US010057509B2

(12) United States Patent
Espersen et al.

(10) Patent No.: US 10,057,509 B2
(45) Date of Patent: Aug. 21, 2018

(54) MULTIPLE-SENSOR IMAGING SYSTEM

(71) Applicant: FLIR Systems, Inc., Wilsonville, OR (US)

(72) Inventors: Adam C. Espersen, Portland, OR (US); Stephen V. McKaughan, The Villages, FL (US); Nicholas J. Lagadinos, Billerica, MA (US)

(73) Assignee: FLIR Systems, Inc., Wilsonville, OR (US)

( * ) Notice: Subject to any disclaimer, the term of this patent is extended or adjusted under 35 U.S.C. 154(b) by 461 days.

(21) Appl. No.: 14/727,790

(22) Filed: Jun. 1, 2015

(65) Prior Publication Data

US 2015/0350569 A1 Dec. 3, 2015

Related U.S. Application Data

(60) Provisional application No. 62/005,802, filed on May 30, 2014.

(51) Int. Cl.
*H04N 5/33* (2006.01)
*G03B 19/02* (2006.01)
*G03B 17/56* (2006.01)
*G03B 17/17* (2006.01)
*G03B 15/00* (2006.01)
(Continued)

(52) U.S. Cl.
CPC ............. *H04N 5/33* (2013.01); *G03B 15/006* (2013.01); *G03B 17/17* (2013.01); *G03B 17/561* (2013.01); *G03B 19/023* (2013.01); *H04N 5/2251* (2013.01); *H04N 5/2258* (2013.01)

(58) Field of Classification Search
CPC ...... H04N 5/2554; H04N 5/33; H04N 5/2251; H04N 5/2258; G03B 19/023; G03B 17/561; G03B 17/17; G03B 15/006
See application file for complete search history.

(56) References Cited

U.S. PATENT DOCUMENTS

| 4,112,818 | A | 9/1978 | Garehime, Jr. |
| 4,187,051 | A | 2/1980 | Kirsch et al. |
| 4,581,648 | A | 4/1986 | Ganther |

(Continued)

FOREIGN PATENT DOCUMENTS

| FR | 2731502 A1 * | 9/1996 | ............... F21V 13/02 |
| WO | WO97/05742 A1 * | 2/1997 | ............... H04N 5/33 |

*Primary Examiner* — Bernarr E Gregory
(74) *Attorney, Agent, or Firm* — Haynes and Boone, LLP

(57) ABSTRACT

Systems and methods according to one or more embodiments are provided for an imaging system having a plurality of sensors associated with input optics. In one example, an imaging system includes input optics configured to receive incident radiation along an input optical axis and a first optical sensor and a second optical sensor, each configured to detect the incident radiation. The imaging system further includes a rotating member positioned between the first and second optical sensors and configured to rotate about the input optical axis and a reflector coupled to the rotating member configured to be selectively positionable by the rotating member to a first orientation, in which the reflector directs the incident radiation along a first secondary axis to the first optical sensor, and to a second orientation, in which the reflector directs the incident radiation along a second secondary axis toward the second optical sensor.

20 Claims, 9 Drawing Sheets

(51) Int. Cl.
*H04N 5/225* (2006.01)
*H04N 5/00* (2011.01)

(56) References Cited

U.S. PATENT DOCUMENTS

| | | | |
|---|---|---|---|
| 4,751,571 A | 6/1988 | Lillquist | |
| 5,373,320 A | 12/1994 | Johnson et al. | |
| 5,745,170 A | 4/1998 | Palmer | |
| 5,790,188 A | 8/1998 | Sun | |
| 6,262,768 B1 | 7/2001 | Williams | |
| 6,285,018 B1 | 9/2001 | Aebi et al. | |
| 6,320,189 B1 | 11/2001 | Ouvrier-Buffet et al. | |
| 6,600,607 B2 | 7/2003 | Funatsu | |
| 6,798,578 B1 | 9/2004 | Beystrum et al. | |
| 6,831,688 B2 | 12/2004 | Lareau et al. | |
| 6,888,470 B2 | 5/2005 | Haueis | |
| 6,891,562 B2 | 5/2005 | Spence et al. | |
| 7,019,777 B2 | 5/2006 | Sun | |
| 7,053,928 B1 | 5/2006 | Connors et al. | |
| 7,057,647 B1 | 6/2006 | Monroe | |
| 7,079,682 B2 | 7/2006 | Niesen | |
| 7,149,366 B1 | 12/2006 | Sun | |
| 7,199,348 B2 | 4/2007 | Olsen et al. | |
| 7,330,649 B2 | 2/2008 | Finizio et al. | |
| 7,432,953 B2 | 10/2008 | Washisu | |
| 7,795,564 B2 * | 9/2010 | Lindgren | H04N 5/2254 |
| 2003/0102431 A1 | 6/2003 | Gaber | |
| 2004/0169765 A1 | 9/2004 | Nakata et al. | |
| 2005/0052570 A1 | 3/2005 | Enomoto | |
| 2007/0223087 A1 | 9/2007 | Pochapsky | |
| 2009/0237792 A1 | 9/2009 | Owashi | |
| 2009/0278929 A1 | 11/2009 | Lagadinos et al. | |

\* cited by examiner

MULTIPLE-SENSOR IMAGING SYSTEM

CROSS-REFERENCES

The present application claims priority to U.S. Provisional Patent Application Ser. No. 62/005,802, filed May 30, 2014, which is incorporated herein by reference.

The following related applications and materials are incorporated herein, in their entireties, for all purposes: U.S. Pat. Nos. 7,264,220; 7,671,311; 8,385,065; U.S. patent application Ser. No. 12/151,381, filed May 6, 2008, now abandoned; and PCT Publication No. WO 2012/170673.

INTRODUCTION

Imaging systems typically include an objective (e.g., a zoom or prime lens) for receiving and focusing incident radiation onto a sensor in line with the input optical axis. The sensor, and an associated processor, may produce a digital image corresponding to the optical information received. Imaging systems such as these are prevalent in devices from handheld consumer grade cameras to military grade imaging devices having sensors that detect radiation outside the visible spectrum. For example, imaging systems may be present in payloads of gimbal systems, pan-and-tilt camera systems, static imaging systems (e.g., NavFLIR systems), and many other applications.

Gimbal systems permit payloads, such as optical devices (e.g., imaging systems and lasers), to be mounted to and used on a support platform. For example, vehicles, such as aircraft, watercraft, and ground vehicles, may provide moving support platforms for gimbal systems. Whether moving or stationary, a gimbal system may enable a payload to be accurately reoriented with respect to the support platform. As an example, the payload may include a camera that can be panned and tilted with respect to the support platform to survey or monitor a broad field of view.

SUMMARY

The present disclosure provides systems, apparatuses, and methods relating to imaging systems having a plurality of sensors associated with common input optics (e.g., a single objective). In some embodiments, an imaging system may include input optics configured to receive incident radiation along an input optical axis; a first optical sensor and a second optical sensor, each configured to detect the incident radiation; and a reflector selectively positionable to a first orientation, in which the reflector directs the incident radiation along a first secondary axis to the first optical sensor, and to a second orientation, in which the reflector directs the incident radiation along a second secondary axis toward the second optical sensor.

In some embodiments, an imaging system may be incorporated into a gimbal system. For example, a gimbal system may include a support portion; a gimbal assembly pivotably connected to and supported by the support portion; and a payload pivotably orientable with respect to the support portion by the gimbal assembly, to provide pan and tilt movement of the payload; wherein the payload includes an imaging system having a single objective, a plurality of sensors associated with the single objective, and a selectively positionable reflector configured to direct incident radiation from the single objective to any one of the plurality of sensors.

A method of using an imaging system may include: receiving incident radiation using an imaging system, the imaging system having input optics and a positionable reflector configured to redirect incident radiation received by the input optics; redirecting the incident radiation from an input optical axis to a first secondary axis different from the input optical axis using the positionable reflector; detecting the redirected incident radiation using a first sensor; receiving a request to utilize a second sensor to process the incident radiation received by the input optics; responding to the request by positioning the reflector such that the incident radiation is directed along a second secondary axis; and detecting the incident radiation using a second sensor different from the first sensor.

Features, functions, and advantages may be achieved independently in various embodiments of the present disclosure, or may be combined in yet other embodiments, further details of which can be seen with reference to the following drawings and description.

DESCRIPTION

Figure 1:
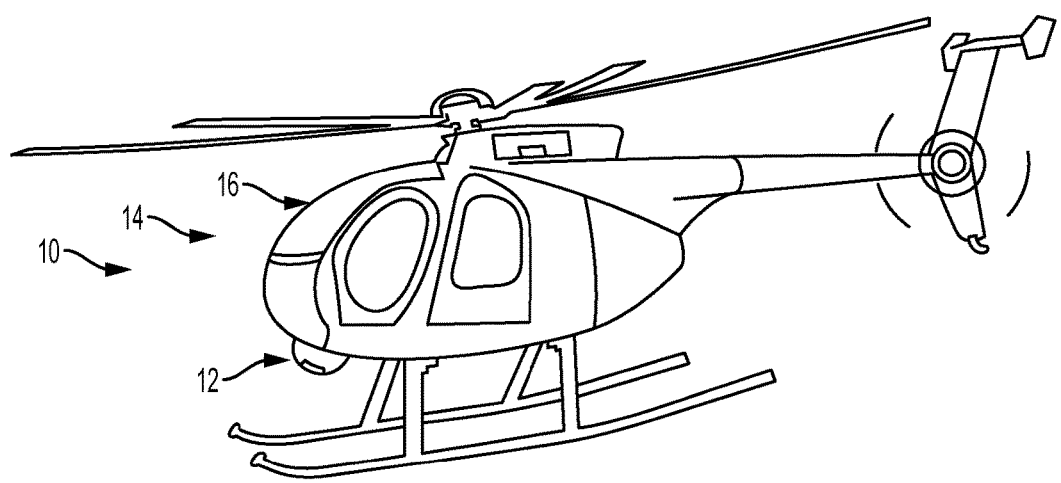
FIG. 1 is a view of an exemplary gimbal system including a turret unit mounted to an exterior of a support platform (namely, a helicopter), in accordance with aspects of the present disclosure.

Various embodiments of an imaging system having a single objective and a positionable reflector for selecting among a plurality of sensors, as well as related methods, are described below and illustrated in the associated drawings. Unless otherwise specified, such an imaging system and/or its various components may, but are not required to, contain at least one of the structures, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other embodiments and similar imaging systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

In general, an imaging system in accordance with aspects of the present disclosure may include a single set of input optics configured to direct incident radiation to multiple sensors via a positionable reflector. The reflector, which may include a prism, redirects the incident radiation along a secondary axis toward a selected one of the sensors. Positioning (e.g., rotation) of the reflector may allow the system to utilize multiple sensors in multiple locations, by redirecting the incident radiation at various angles. Such an imaging system may be utilized in any suitable host device. Several such devices are described herein, with an emphasis on a gimbal system. However, this emphasis is for context and convenience of explanation only, and should not be taken as a limitation on the applicability of the system.

The imaging system, as described above, may be suitable for use in gimbal systems and other host devices. The imaging system of the present disclosure may enable a plurality of sensors to utilize a single objective, such as a zoom lens. In this context, the objective or input optics may be termed a "common" objective or "common" input optics, in the sense that the input optics or objective are devices that the sensors share or have in common.

Imaging systems of the present disclosure may be suitable for use in a pan and tilt system. Pan and tilt (also termed "pan-tilt") devices may include any suitable device configured to provide real-time, computer-controlled positioning of a payload. Payloads may include thermal cameras, video cameras, IP cameras, laser rangefinders, microwave antennas, and/or the like, or any combination of these (as described further below). Pan-tilt devices may carry multi-sensor camera systems and antennas, and may include multiple mounting options for fixed and mobile applications. In some examples, a pan-tilt device may include inertial Line of Sight (LOS) stabilization of a payload from mobile platforms including ground, air, and sea. Inertial stabilization facilitates real-time computer control during stabilization, enabling closed loop systems for tracking and slew-to-cue.

Imaging systems of the present disclosure may also be suitable for use in fixed or static systems and/or in a gimbal system, among others. A gimbal system typically includes a gimbal assembly pivotably connected to and supported by a support portion. The support portion, in turn, may include electronic components, such as a processor or controller. The gimbal system may include a payload, such as an optical detection device, which may be in communication with one or more of the electronic components. The payload may be supported by the gimbal assembly and pivotably orientable with respect to the support portion. Pivotable orientation may be achieved about a pair of nonparallel axes by controlled, driven motion of the gimbal assembly, thereby providing pan and tilt movement of the payload.

The payload may include one or more optical systems configured to receive optical input and process the optical input via one or more sensors. Systems and methods are described below, in which multiple sensors or sensor assemblies may utilize a common optical input device such as a zoom lens.

The following sections describe selected aspects of exemplary imaging systems, as well as related systems and/or methods. The examples in these sections are intended for illustration and should not be interpreted as limiting the entire scope of the present disclosure. Each section may include one or more distinct inventions, and/or contextual or related information, function, and/or structure. These sections include (I) definitions, (II) overview of an exemplary gimbal system, (III) support portions, (IV) gimbal assemblies, (V) payloads, (VI) support platforms, (VII) a multi-sensor imaging system with a positionable reflector, (VIII) a gimbal assembly having an imaging system with a prism rotatable about the input optical axis, (IX) a method for imaging using a single objective and multiple sensors, and (X) selected embodiments.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV C (from about 100 nm to about 280 or 290 nm), (B) UV B (from about 280 or 290 nm to about 315 or 320 nm), and (C) UV A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 μm) and between about 7,000 or 8,000 and 14,000 nm (i.e., 7 or 8 and 14 μm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. Overview of an Exemplary Gimbal System

FIG. 1 shows an exemplary gimbal system 10 including a turret unit 12 (also termed a gimbal apparatus) mounted to the exterior of a support platform 14. In the present illustration, support platform 14 is a vehicle, namely, a helicopter 16. In other examples, support platform 14 may include a boat or land-based vehicle. In some examples, turret unit 12 may be oriented differently, such as by mounting at a lower end rather than an upper end as shown in FIG. 1.

Figure 2:
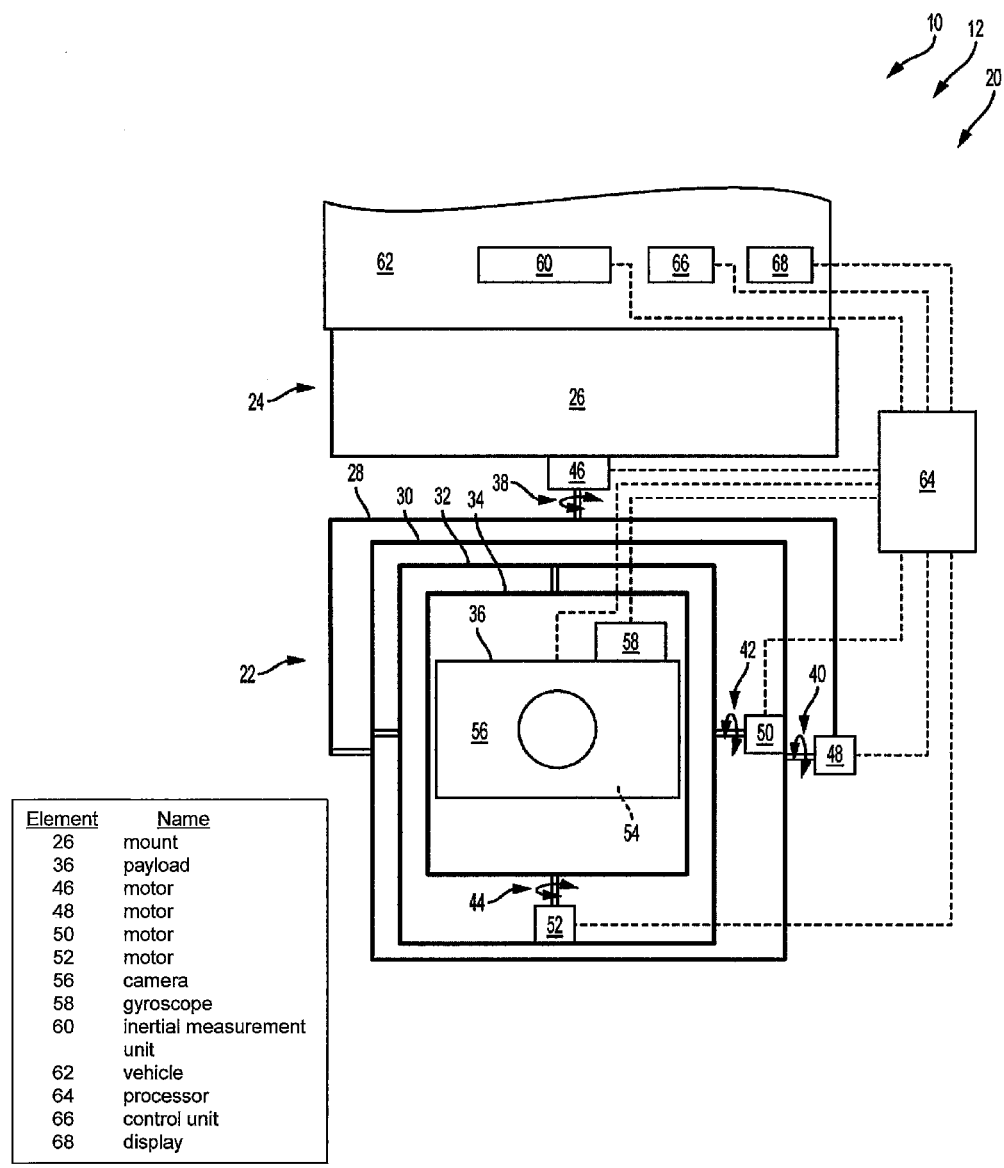
FIG. 2 is a schematic view of selected aspects of the gimbal system of FIG. 1, in accordance with aspects of the present disclosure.

FIG. 2 shows a schematic view of selected aspects of a gimbal system 20, which is an embodiment of gimbal system 10. A gimbal assembly 22 may be connected to and supported by mount 26 (e.g., with the gimbal assembly located below or above the mount, among others) and may be pivotable collectively with respect to the mount (and the vehicle). The mount and/or a portion thereof may be relatively stationary with respect to vehicle 28, and the gimbal assembly may be relatively movable with respect to the vehicle. System 20 also may be equipped with a payload 30 (e.g., including at least one or more optical devices, such as at least one light source and/or an optical sensor (e.g., an image sensor of a camera 32)) that is orientable with respect to mount 26 (and the vehicle) by rotation of gimbals of gimbal assembly 22 about a plurality of axes (e.g., at least two nonparallel axes and/or a pair of orthogonal axes, among others).

A mount 24 may include one or more frame members 26. A frame member may be secured to a support platform via attachment features of the frame member (and/or with one or more brackets, among others). For example, the frame member may define a set of apertures to receive fasteners. The apertures may have any suitable position, such as being disposed generally centrally or near a perimeter of the frame member.

Gimbal assembly 22 may comprise a series of two or more gimbals, such as first through fourth gimbals 28, 30, 32, and 34. Each gimbal is pivotably connected to preceding and succeeding gimbals of the series, for example, via one or more axle members or axle assemblies. First gimbal 28 supports second through fourth gimbals 30, 32, 34, and payload 36, and is pivotably connected to and supported by frame member 26 for rotation about a first axis 38 (e.g., a first yaw, azimuthal, and/or vertical axis), which may extend at least generally centrally through mount 24 and/or frame member 26. Second gimbal 30 supports third and fourth gimbals 32, 34 and payload 36, and is pivotably connected to and supported by first gimbal 28 for rotation about a second axis 40 (e.g., a first pitch, elevational, and/or horizontal axis), which may be orthogonal to first axis 38. Third gimbal 32 supports fourth gimbal 34 and payload 36, and is pivotably connected to and supported by second gimbal 30 for rotation about a third axis 42 (e.g., a second pitch, elevational, and/or horizontal axis). Third axis 42 may be parallel to, and/or or coaxial with second axis 40 (or first axis 38 with the gimbal assembly in a neutral position). Fourth gimbal 34 supports payload 36, and is pivotably connected to and supported by third gimbal 32 for rotation about a fourth axis 44 (e.g., a second yaw, azimuthal, and/or vertical axis). Fourth axis 44 may be parallel to, and/or coaxial with first axis 38 (or second axis 40 with the gimbal assembly in a neutral position). The payload may or may not be fixed to the fourth gimbal. In some cases, rotation of first and second gimbals 28 and 30 may provide larger adjustments to the orientation of payload 36, and rotation of third and fourth gimbals 32 and 34 may provide smaller adjustments to the orientation (or vice versa).

Rotation of each gimbal 28-34 may be driven by a drive mechanism, such as respective motors 46, 48, 50, and 52. Each motor may be attached to its corresponding gimbal or to the structure that supports the gimbal, or a combination thereof. For example, motor 46 may be attached to frame member 26 or first gimbal 28; motor 48 to first gimbal 28 or second gimbal 30; and so on. The angular orientation of the payload may be adjusted horizontally and vertically via rotation of gimbals 28-34, without changing the orientation of the support platform, and/or the payload may continue to point at a target as the attitude and location of the support platform changes, among others. Accordingly, the gimbal system may allow one or more fixed and/or moving targets to be monitored or tracked over time from a fixed and/or moving support platform.

The gimbal system also may comprise one or more sensors to sense aspects of the vehicle, of one or more gimbals, of the payload, or of a target. Exemplary sensors include an orientation sensor (e.g., a gyroscope that measures angular position or rate of angular change, among others), an accelerometer, an optical sensor to detect optical radiation (e.g., an image sensor 54 in a camera 56), or the like, or any combination of these. At least one gimbal of the gimbal assembly and/or the payload may be attached to at least one gyroscope 58 to measure the orientation of the gimbal and/or payload. In some cases, the gimbal system may include at least one inertial measurement unit (IMU) 60, which may be carried by gimbal assembly 22 (e.g., by payload 36 or fourth gimbal 34), and/or a supporting vehicle 62. The IMU may include sensors to measure acceleration along three orthogonal axes and angular position/change about three orthogonal axes. Measurements from unit 60 alone or in combination with those from one or more other gyroscopes of the gimbal assembly may be used to aim the payload with respect to an inertial reference frame (e.g., the earth), as the vehicle travels with respect to the reference frame.

Gimbal system 20 also may comprise a processor 64, and a user control unit 66 to communicate inputs, such as user preferences, commands, etc., to the processor. The processor may be included in gimbal assembly 22 (and/or mount 24), vehicle 62, or a combination thereof, among others. The user control unit may be disposed in the vehicle, if the vehicle has a person onboard, or may be disposed elsewhere (e.g., on the ground) if the vehicle is unmanned.

The processor may include any electronic device or set of electronic devices responsible for signal processing, manipulation of data, and/or communication between or among gimbal system components. The processor may be localized to one site or may be distributed to two or more spaced sites of the gimbal system. The processor may be programmed to receive user inputs from user control unit 66 and to control operation of and/or receive signals from any suitable system components, as indicated by dashed lines in FIG. 2, for example, the motors, sensors (e.g., one or more optical devices, one or more IMU's, gyroscopes, accelerometers, etc.), payload 36, a display 68 carried by vehicle 62, and so on. Accordingly, the processor may be in communication with the motors, sensors, and display, to receive signals from and/or send signals to these devices, and may be capable of controlling and/or responding to operation of these devices. Also, the processor may be responsible for manipulating (processing) image data (e.g., a representative video signal) received from camera 56 before the signal is communicated to display 68, to drive formation of visible images by the display.

Gimbal assembly 22 may include and/or be connected to a power supply. The power supply may include any mechanism for supplying power, such as electrical power, to the motors, sensors, payload, processor, etc. The power supply may be provided by the support platform, the mount, the gimbal apparatus, or a combination thereof, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Additional features and aspects that may be suitable for the gimbal system are disclosed, for example, in U.S. Pat. No. 7,671,311.

III. Support Portions

A support portion may be any part of a gimbal system that supports a gimbal assembly. In some cases, the support portion may include a mounting/control portion that connects a gimbal assembly to a support platform and/or that carries electronics providing one or more aspects of gimbal system control and/or data processing. The support portion may form an end region of a turret unit. Also, this portion may be unstabilized and may be termed a "skillet."

The support portion may support a gimbal assembly and may be connected directly to at least one gimbal and connected indirectly to one or more additional gimbals of the gimbal assembly. The support portion, in turn, may be attached to a support platform (see Section VI) or may rest upon a support platform without attachment thereto. The support portion may be mounted to a support platform via any suitable mechanism, with any suitable orientation. For example, when used with a vehicle, a support portion (and/or the corresponding turret unit) may be bottom-mounted, side-mounted, top-mounted, front-mounted, rear-mounted, externally mounted, internally mounted, and/or so on. Moreover, such mounting may be static or dynamic, for example, involving additional gimbal(s) to provide dynamic mounting. The support portion may carry and/or contain any suitable components of a turret unit, including a controller (s), power supply, electrical conduits or other electrical circuitry, a fan(s), and/or the like.

The support portion may have any suitable shape. In some embodiments, the support portion may be at least generally cylindrical. The support portion may be shaped at least generally as a disc.

IV. Gimbal Assemblies

A gimbal assembly, as used herein, is a hierarchical arrangement of two or more pivotable members (gimbals). A gimbal assembly may include a higher-order gimbal pivotally coupled directly to a support portion. The gimbal assembly also may include a lower-order gimbal pivotally coupled directly to the higher-order gimbal and indirectly to the support portion, such that the lower-order gimbal is carried by the higher-order gimbal. As a result, pivotal motion of the higher-order gimbal in relation to the support portion results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including 2, 3, 4, 5, 6, or more axes. In some embodiments, some of the axes of rotation may be collinear or coplanar. The axes of rotation typically are either orthogonal to one another or parallel to (including collinear with) one another, although this is not required. In some embodiments, parallel axes of rotation, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the support portion) and having a relatively smaller range of angular motion (such as less than about 90 degrees).

Each gimbal of a gimbal assembly may be driven controllably by a driver. An exemplary driver that may be suitable is described in U.S. Pat. No. 7,561,784.

V. Payloads

A payload includes any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a controller that sends signals to and/or receives signals from the payload. The payload may be coupled (generally via a controller) to a display such that signals from the payload may be formatted into a visual form for viewing on the display. The present disclosure may be especially useful when the payload contains high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), (5) subtractive elements (such as filters), and/or (6) electro-optic elements (such as a Kerr cell or a Pockels cell), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

Further aspects of imaging systems that may be suitable for the gimbal system of the present disclosure are described in the following patent, which is incorporated herein by reference: U.S. Pat. No. 7,515,767.

VI. Support Platforms

The gimbal system of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.), or the like.

The support platform may be fixed in position. Exemplary fixed support platforms may include a building, an observation tower, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, and/or surveillance, among others.

VII. Multi-sensor Imaging System with a Positionable Reflector

Figure 3:
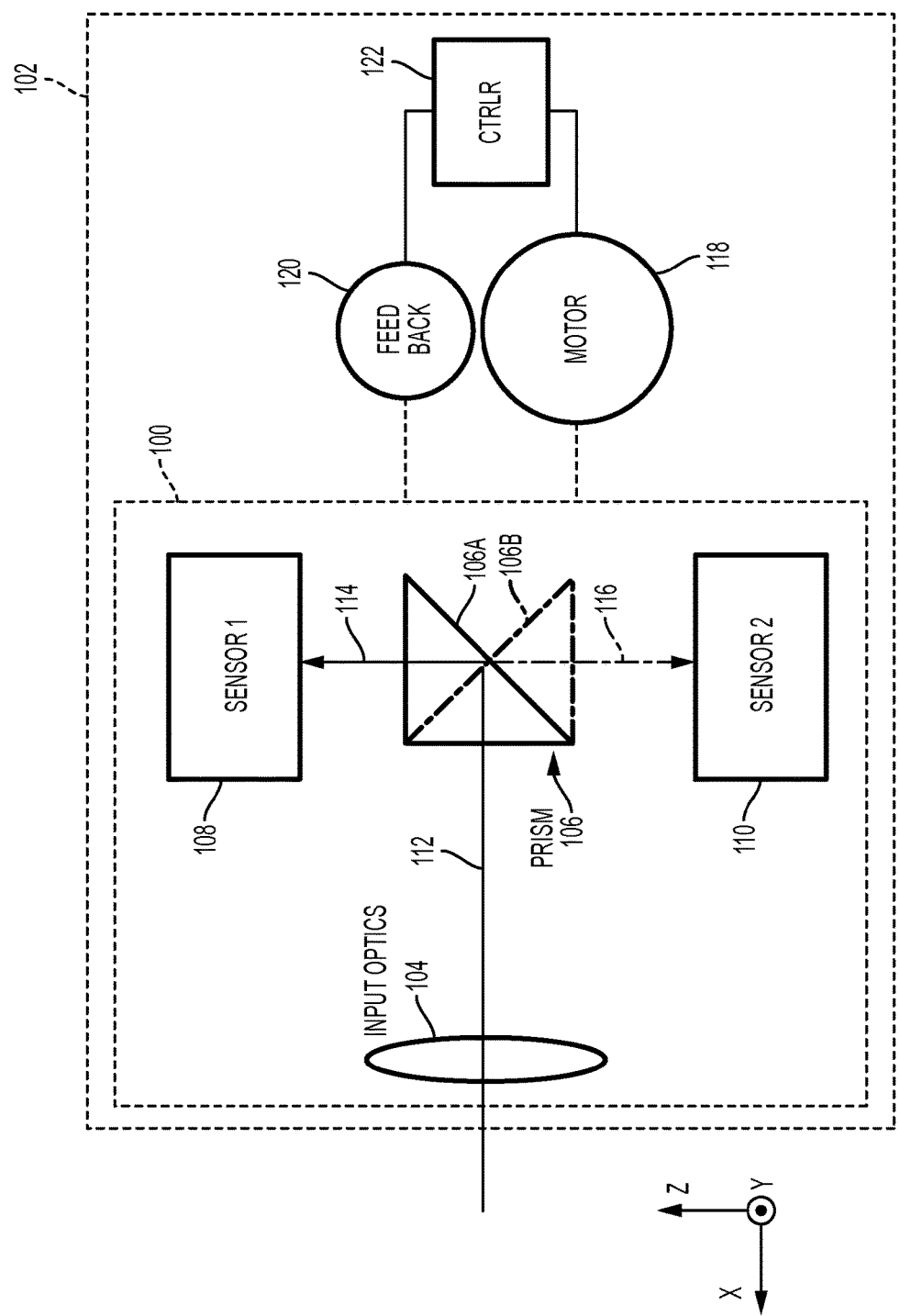
FIG. 3 is a schematic diagram of an illustrative imaging system, in accordance with aspects of the present disclosure.

This example describes an imaging system 100 having a single objective and a positionable reflector; see FIG. 3.

Imaging system 100 may be installed or incorporated into any suitable host apparatus 102. For example, imaging system 100 may be incorporated into the payload of a turret unit (described above), a handheld imaging device, a pan and tilt imaging device, a static imaging device, a ground-based imaging device, or the like, and/or any other suitable imaging system having multiple sensors. For ease of description, host apparatus 102 may be described below as the payload of a turret unit having a gimbal system.

In general, imaging system 100 may be configured with a reflector (e.g., a prism, mirror, and/or other reflective structure or device) that can be repositioned to allow multiple, stationary sensors to utilize a shared optical input device, also referred to as a collector. The reflector facilitates this functionality by redirecting the inbound radiation toward a selected, off-axis sensor. This arrangement may allow compact packaging of multiple sensor assemblies and discrete sensor alignment for boresighting of multiple sensors using a shared objective, such as a zoom lens. If a prism is used, the higher index of the prism also extends the focal distance of the objective, permitting the focal planes of the multiple sensors to be spaced from the objective. Placing the sensors farther from the objective allows space for the prism to operate. If a mirror (or the like) is used, the radiation path does not generally travel through a higher index material, which may reduce image quality degradation. In the examples below, a prism is described, with the understanding that any suitable reflector may be utilized, depending on the application.

Imaging system 100 may include input optics 104, a reflector, e.g., an internally reflective prism 106, and one or more sensors, shown here as sensor 108 and sensor 110. Input optics 104 may include any suitable structure or assembly configured to gather, direct, filter, and/or focus radiation, such as visible and/or infrared light, incident generally along an input optical axis 112. For example, input optics may be an objective. In some examples, input optics 104 may include a zoom lens and/or electro-optic components.

More specifically, input optics 104 may comprise one or more optical elements that transmit incident radiation directly or indirectly to a sensor 108, 110. An optical element includes any structure or device that collects, directs, and/or focuses optical radiation and/or selectively reduces or blocks undesired radiation. An optical element may function by any suitable mechanism, such as refracting, reflecting, diffracting, and/or filtering, among others, optical radiation. Exemplary optical elements include lenses, mirrors, gratings, prisms, filters, beam splitters, transmissive fibers (fiber optics), and/or the like. Input optics 104 may define an optical path traveled by incident radiation to a sensor. The input optics may form an optical window through which optical radiation is received by an imaging assembly and/or camera. In exemplary embodiments, input optics 104 may include a multispectral objective capable of gathering and focusing radiation of various wavelengths, for example, multiple infrared wavelengths (any combination of near-IR/NIR, SWIR, MWIR, and LWIR), infrared and visible wavelengths, ultraviolet and visible wavelengths, or ultraviolet, visible, and infrared wavelengths, among others.

Input optics 104 may include one or more coatings (e.g., to reduce glare and/or reflections and/or for protection), a filter (e.g., to block undesired radiation), and/or the like. The coatings may include a hard coating, such as diamond or diamond-like carbon, on an exterior surface region of each objective lens to improve durability. The filter may be a wavelength filter, an intensity filter, a polarizing filter, a safety filter to block light from a laser (such as a laser weapon), or the like. Exemplary wavelength filters include a band-pass filter, a high or low cut-off filter, a notch filter, or any combination thereof, among others. The filter may block only part of a spectral range, such as blocking only part of the spectral range of infrared radiation, only part of the LWIR range (an LWIR filter), only part of the MWIR range (an MWIR filter), only part of the SWIR range (an SWIR filter), only part of the visible range (a visible light filter), and so on. The filter may be disposed or disposable on the optical path that incident radiation travels to the sensor, and thus is interposed or interposable between an observed scene and the sensor.

Prism 106 may include any suitable structure configured to act as a prism to refractively and/or reflectively redirect radiation transmitted by input optics 104 from input optical axis 112 to at least one other optical axis. In the example shown in FIG. 3, prism 106 is a reflective, right-angle, triangular prism configured to selectively redirect incident radiation to one of two secondary optical axes (114, 116), each of which is transverse (e.g., orthogonal) to the input optical axis. However, prism 106 may include any suitable prism, such as a Porro prism, a Bauernfeind prism, a penta-prism, an Amici or other roof prism, a corner cube, retroreflector, or trihedral prism, a rhomboid prism, and/or any combination of these and other types of prisms. Furthermore, prism 106 may be configured to alter the angle of incident radiation by an angle other than 90 degrees, or to alter the angle by a certain amount when the prism is in a first orientation and by a different amount when in a second orientation.

Prism 106 may be configured to be positionable or movable (e.g., to two positions as indicated by reference numbers 106A and 106B), thereby selectively directing the incident radiation toward a chosen sensor (108, 110). In some examples, prism 106 may be translatable, such that the prism moves along a path, such as into or out of the path of incident radiation. In some examples, prism 106 may be capable of being reoriented, such as by rotation about an axis. In the example shown in FIG. 3, prism 106 is rotatable about an axis that is perpendicular to input optical axis 112. In some examples, prism 106 may instead be rotatable about an axis that is parallel to or coaxial with input optical axis 112. In those examples, prism 106 may nonetheless retain the same orthogonal radiation-redirection functionality. In some examples, prism 106 may be rotatable about multiple axes to redirect incident radiation in other selected directions and/or to destination sensors oriented at different angles.

Movement of prism 106 may be achieved using a drive system including a motor 118 operatively connected to the prism. Motor 118 may be any suitable provider of motive force configured to rotate, translate, and/or otherwise move prism 106 through a desired path. For example, motor 118 may include an electrical drive motor configured to rotate prism 106 by 180 degrees, about an axis perpendicular to input optical axis 112, as shown in FIG. 3.

Rotation or other movement of the prism may be tracked by a feedback mechanism 120, and may be controlled and monitored by a controller 122. Controller 122 may include, be in communication with, or be incorporated into processor 64 described above. In some examples, controller 122 may include one or more circuits in or associated with host 102.

In some examples, prism 106 may be operatively coupled to a rotatable member (not shown) driven by motor 118. The rotating member of the assembly may in turn activate or modify a potentiometer, counter, switch, or other feedback mechanism 120. Controller 122 may monitor the feedback mechanism to determine an accurate position or orientation of prism 106, and may control speed and/or direction of motor 118 based on a difference between the actual and desired positions of the prism.

Sensors 108 and 110 may each include any suitable structure, device, and/or mechanism configured as an image sensor for detecting images formed by the input optics and for converting the images into a representative video signal. More specifically, a sensor may include any device configured to detect radiation of interest (such as a visible image formed by input optics 104) and to convert the detected radiation into a signal representative of the detected radiation or image. A sensor may create a video signal by detecting a series of images over time, such as at a constant rate of image detection. A sensor generally includes a two-dimensional array of photosensitive elements or pixels.

A sensor may, for example, include a cooled or uncooled infrared sensor (such as a focal plane array or microbolometer), a visible light sensor (such as a CCD or CMOS device), or the like.

In some examples, sensors 108 and 110 may be set or adapted to detect the same type of optical radiation. In some examples, sensors 108 and 110 may be adapted to detect the same wavelength bands (spectral ranges) of a given type of optical radiation (e.g., among others, ultraviolet sensors, visible light sensors, infrared sensors (each detecting SWIR, MWIR, and/or LWIR). Alternatively, the sensors may be set or adapted to detect different wavelength bands (e.g., among others, an SWIR sensor and an LWIR sensor, an SWIR sensor and an MWIR sensor, an MWIR sensor and an LWIR sensor, a visible light sensor and an infrared (SWIR, MWIR, and/or LWIR) sensor, an ultraviolet sensor and a visible light sensor, an ultraviolet sensor and an infrared sensor, and so on. One or more of the sensors also may simultaneously detect multiple wavelength bands (e.g., among others, SWIR and LWIR, MWIR and LWIR, or one or more infrared bands and visible). Multispectral sensors may allow greater flexibility. In some examples, sensor 108 may include a high resolution, color, visible light sensor, and sensor 110 may include a very sensitive, low-light, monochrome (visible and NIR) sensor. Each sensor 108, 110 in functional combination with input optics 104, may be described as a camera or a collector.

In some embodiments, sensor 108 may include a color high-definition CCD to provide high-resolution color imagery in daylight. Color high-definition CCD cameras may not be very sensitive, resulting in poor low-light performance. Accordingly, sensor 110 may include a monochrome low light sensor that can be used at twilight or at night. This camera (either an EMCCD or an sCMOS camera) has lower resolution than the color camera and is monochrome only. However, much better low light performance is provided (2-3 orders of magnitude) than the color camera. The system may be configured to automatically switch to the low light camera when conditions become too dark for the color camera. In some embodiments, more than two cameras (e.g., three or four, or more) may be included. Sensors may be disposed at 90° angles to each other, or any other suitable angles or combinations thereof.

In some embodiments, input optics 104 may include a zoom lens designed for use with a three-CCD camera having internal prisms to separate red, yellow, and blue. Including the glass of prism 106 may result in corrections that facilitate use of a one-CCD camera with this zoom lens. In some embodiments, input optics 104 may include a lens designed for a one-CCD camera. In these embodiments, it may be unnecessary or undesirable to use a glass prism, and a series of one or more mirrors may be used instead.

In operation, turret unit 102 may be used to view or track a target object. Regardless of the scene being viewed, a user may select from various cameras. For example, a user may view a scene using an IR camera or a low-light camera. With imaging system 100, the user can select between multiple sensors that utilize the same objective. For example, in one configuration, incident radiation may pass through input optics 104 along input optical axis 112 and be redirected by prism 106 to sensor 108 via secondary optical axis 114. A user, or the system automatically, may then select a configuration that requires sensor 110. Controller 122 may then reposition prism 106 using motor 118 such that incident radiation is redirected to sensor 110 via secondary optical axis 116. Feedback on the instantaneous position of prism 106 may be provided to the controller via feedback mechanism 120, allowing controller 122 to adjust the positioning rate as needed, such as by slowing the rate as the final position is approached, and to stop when in the desired position.

VIII. Gimbal Assembly Having an Imaging System with a Prism Rotatable About the Input Optical Axis As shown in FIGS. 4-10, this section describes an imaging system 200 incorporated into the payload of a turret unit 202. Imaging system 200 is an example of imaging system 100, described above, and includes a prism 204. Accordingly, similar components may be labeled with similar reference numbers.

Figure 4:
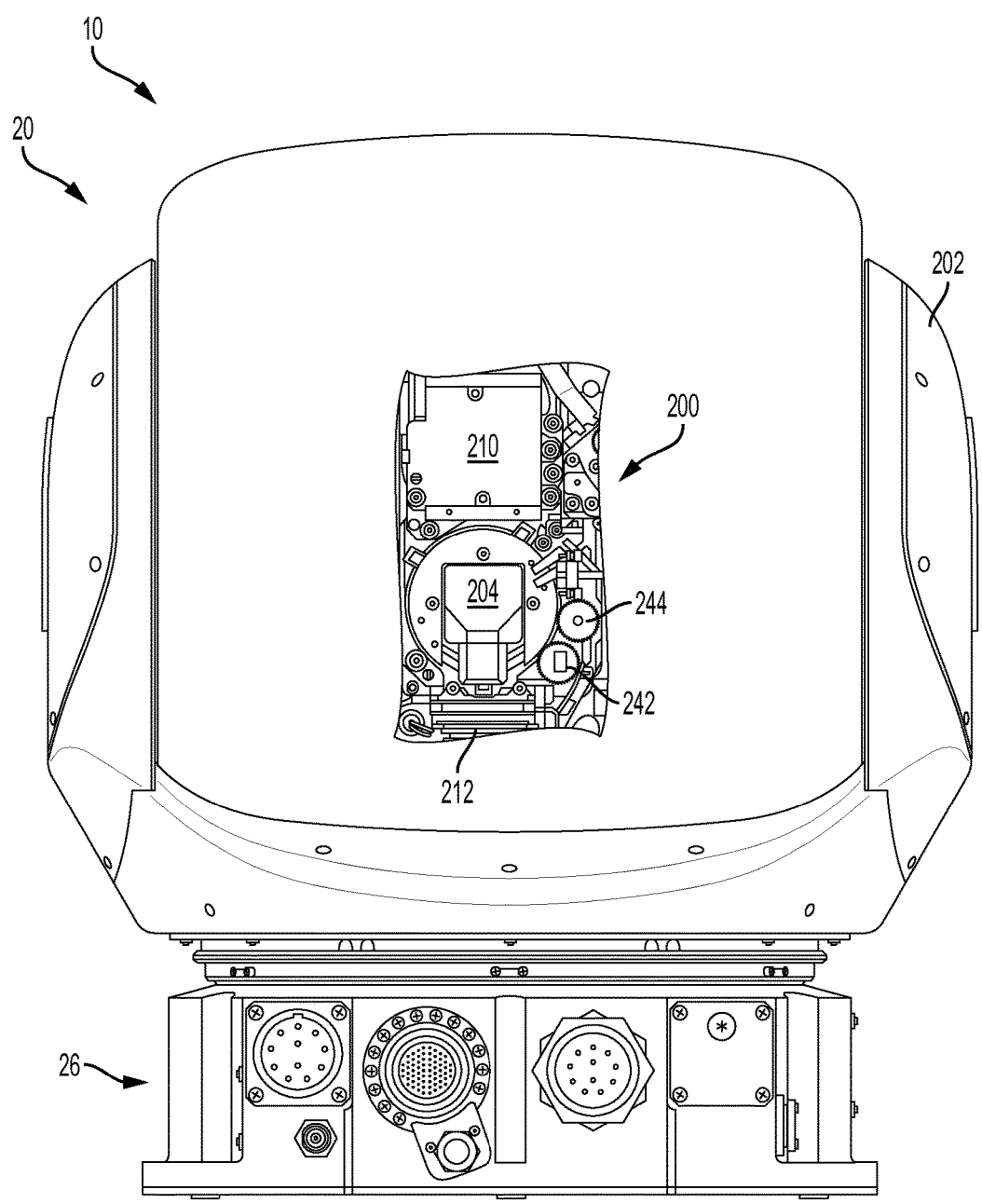
FIG. 4 is a partial cutaway view of an illustrative turret unit including an example of the imaging system shown in FIG. 3.
Figure 5:
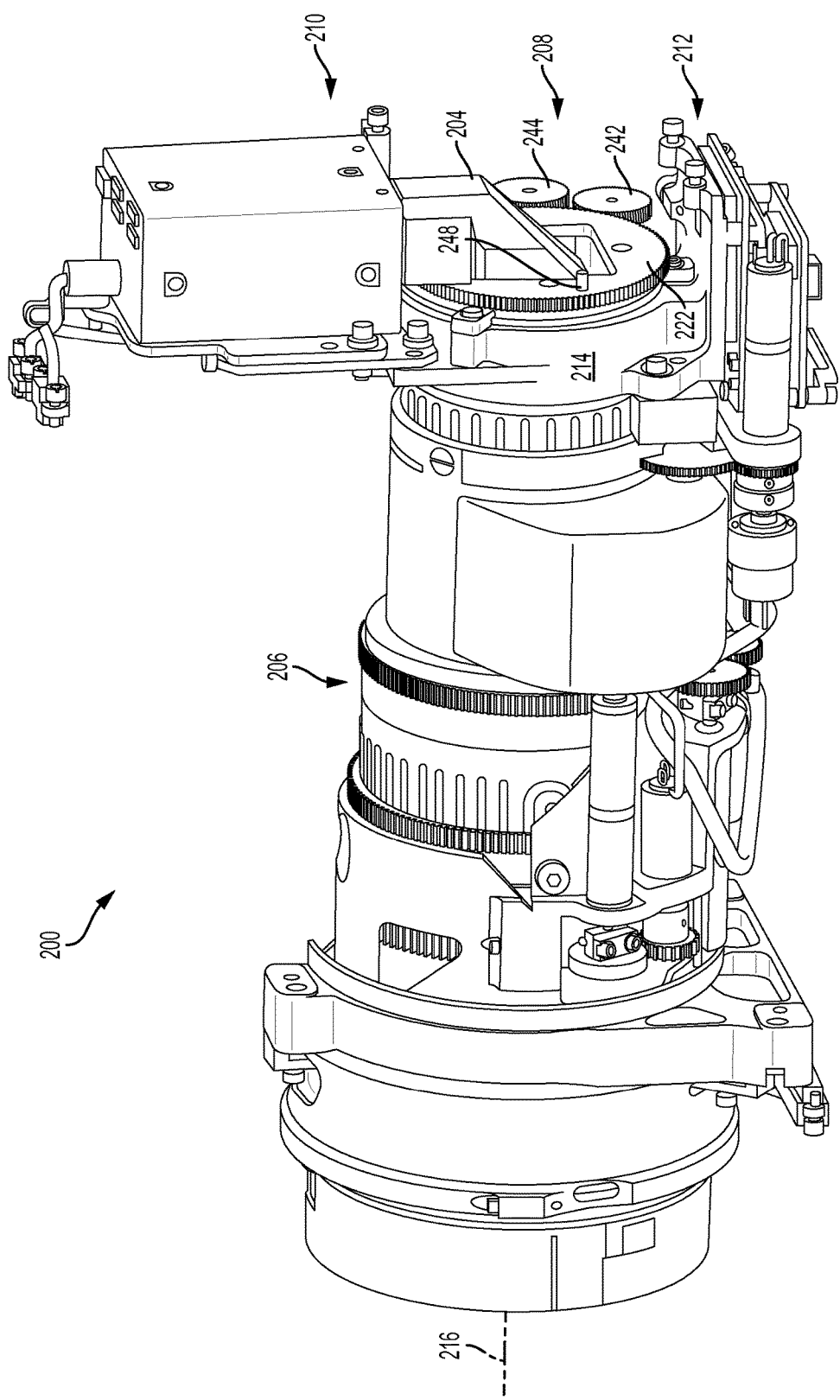
FIG. 5 is an isometric view of an illustrative imaging system including a positionable prism, in accordance with aspects of the present disclosure.
Figure 7:
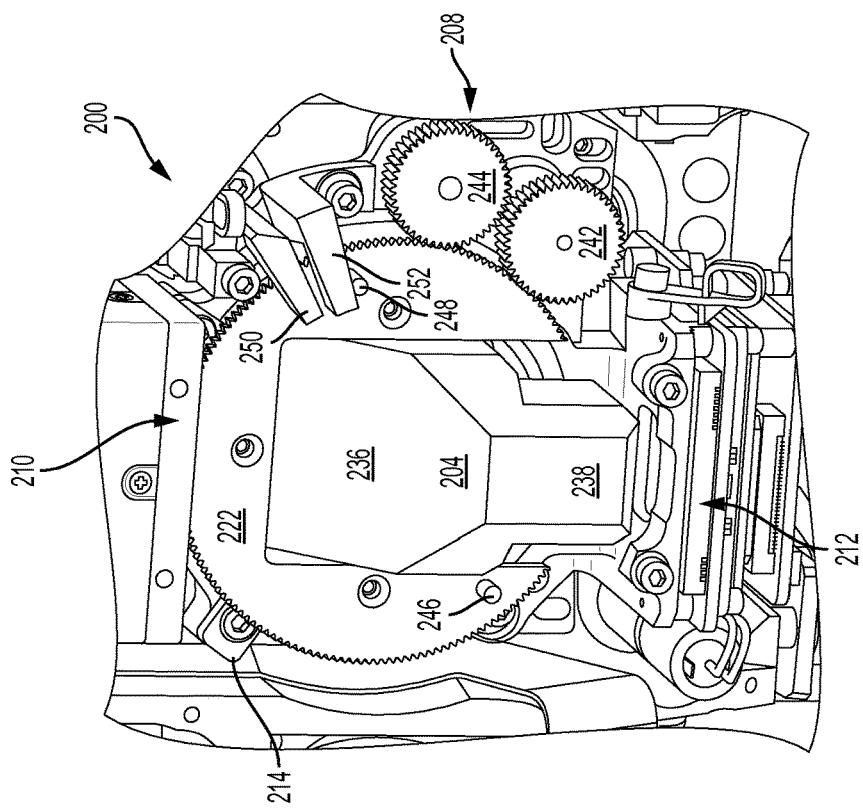
FIG. 7 is a partial isometric view of the imaging system of FIG. 7, showing the prism in a second orientation.
Figure 6:
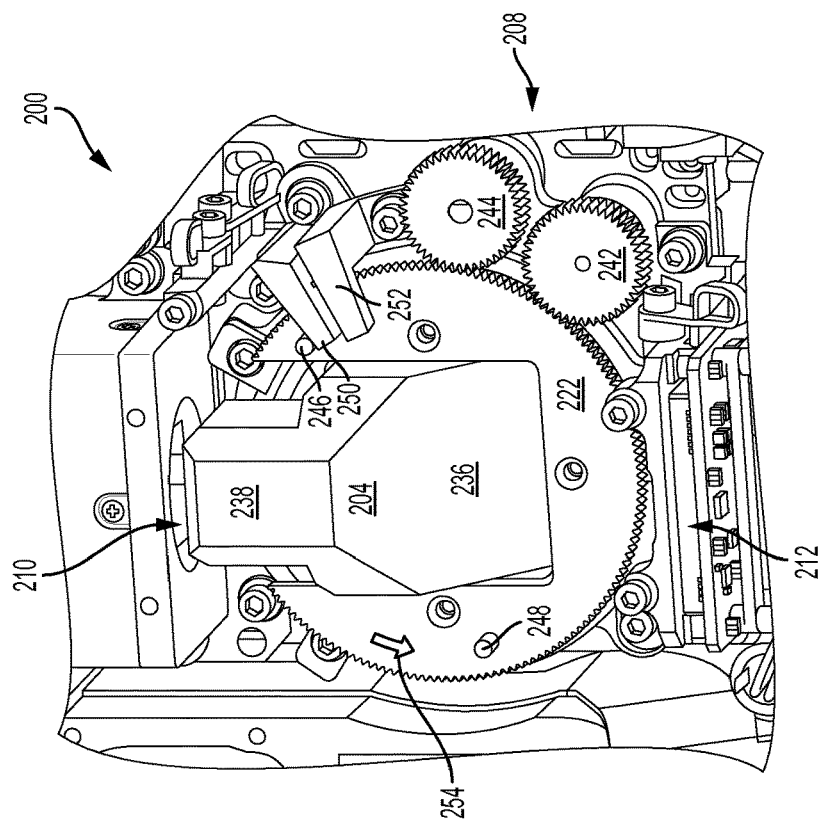
FIG. 6 is a partial isometric view of an illustrative imaging system installed in a host apparatus, showing a prism in a first orientation.
Figure 8:
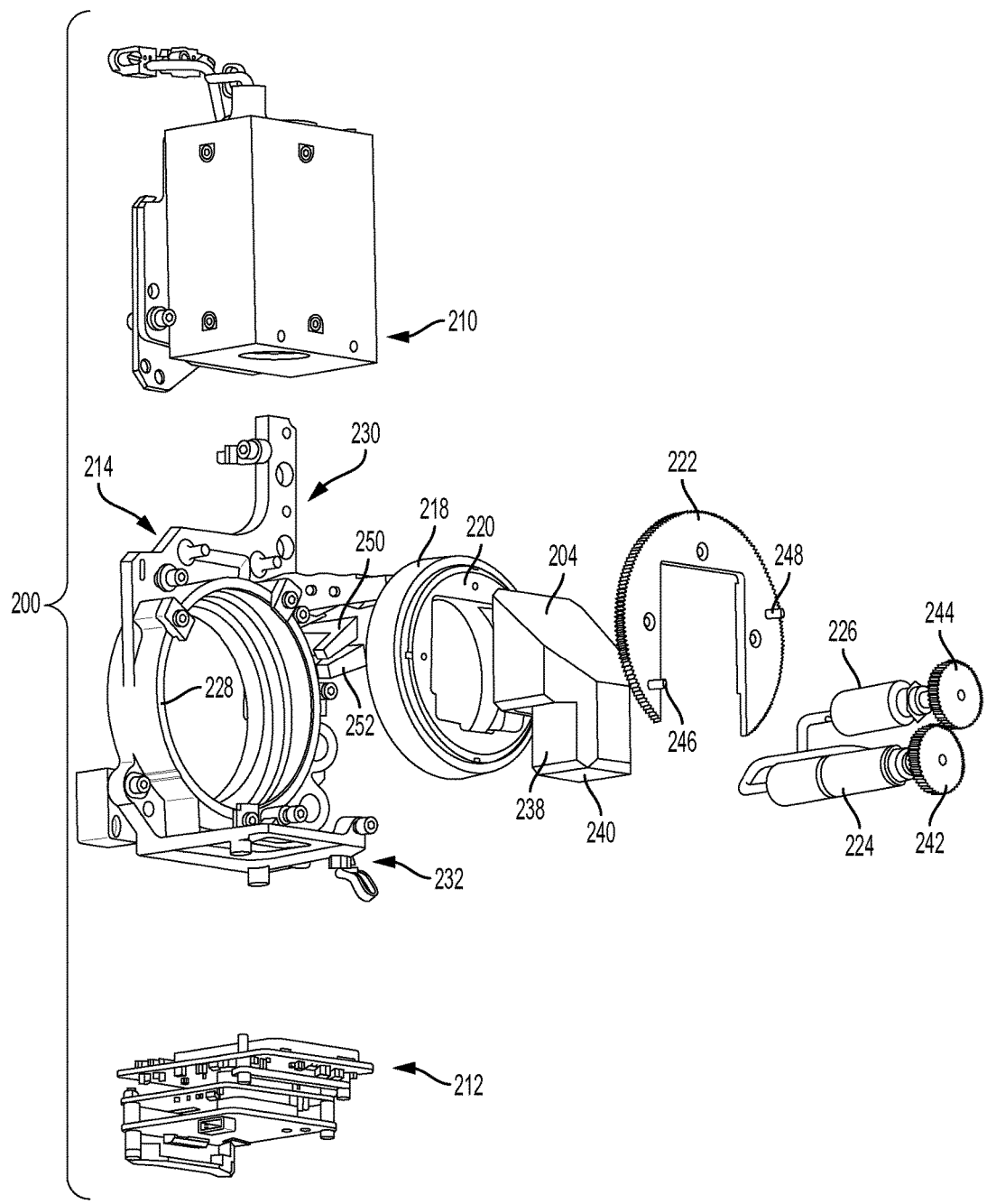
FIG. 8 is an exploded view of a portion of the imaging system of FIG. 5.
Figure 10:
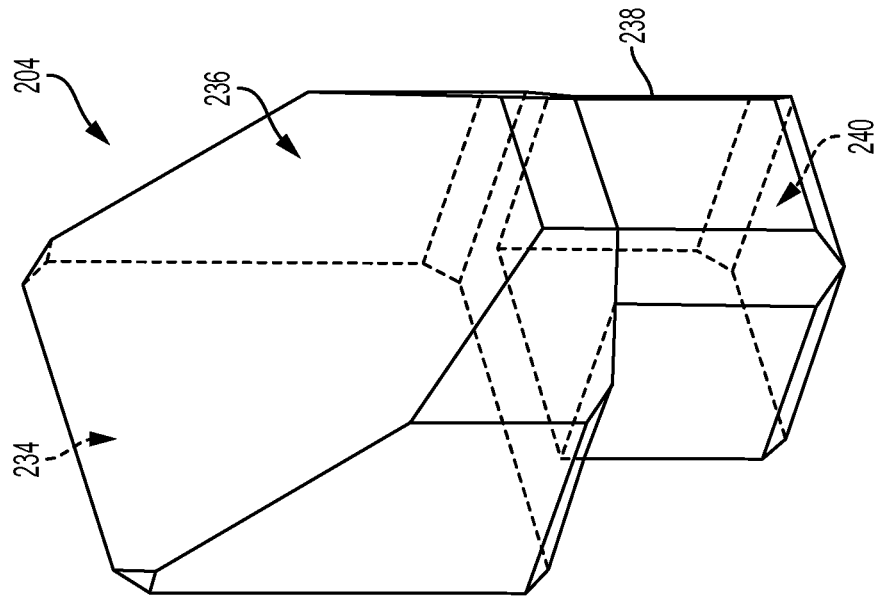
FIG. 10 is an isometric view of the prism element of FIG. 9, with an angled reflective face toward the viewer.
Figure 9:
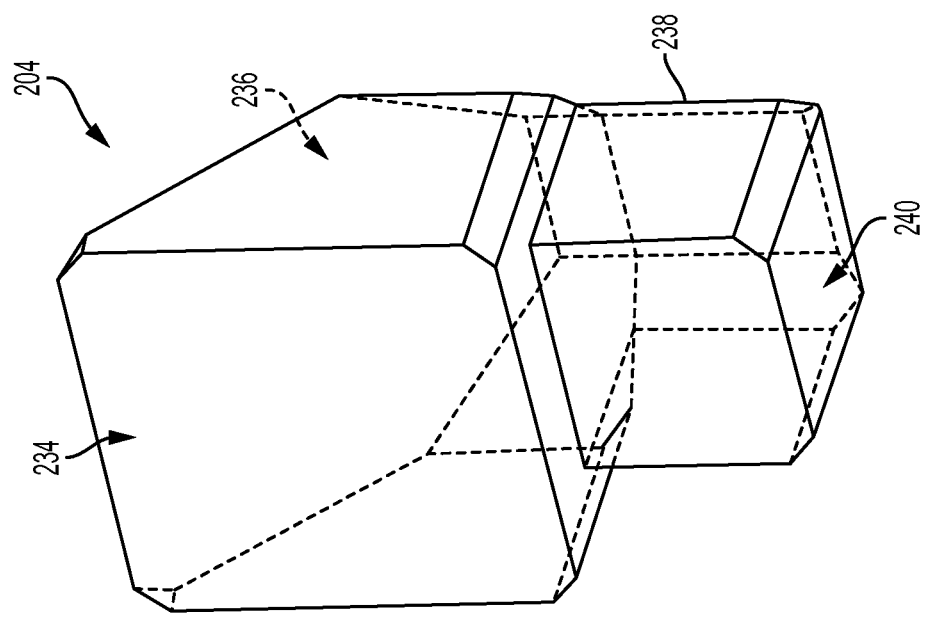
FIG. 9 is an isometric view of an illustrative prism element suitable for use in an imaging system, in accordance with aspects of the present disclosure, with a radiation-incident face toward the viewer.

FIG. 4 is a rear cutaway view of turret unit 202, showing relative arrangement of imaging system 200 within the turret unit. Turret unit 202 is substantially as described above (e.g., in section II), and is an example of host 102, described in section VII. FIG. 5 is an isometric side view of imaging system 200, removed from turret unit 202 to show relative arrangement of various components. FIGS. 6 and 7 are isometric rear views of imaging system 200 in turret unit 202, showing two different orientations of prism 204. FIG. 8 is an isometric exploded view of the prism drive assembly and sensors of imaging system 200. FIGS. 9 and 10 are isometric views of prism 204.

Imaging system 200 includes input optics 206 (shown as a zoom lens), a prism drive system 208, a first sensor assembly 210, a second sensor assembly 212, and a mounting bracket 214. Incident radiation is redirected by prism 204 to one of the two sensor assemblies 210, 212. Prism 204 is an example of reflector/prism 106, as described above. In this example, prism 204 is configured to rotate about an input optical axis 216, such that turning the prism 180 degrees causes incident radiation to be directed to the currently non-selected sensor assembly.

Prism drive system 208 may include any suitable structures and/or devices configured to controllably rotate prism 204 about axis 216. In the example depicted in FIGS. 4-8, prism drive system 208 includes prism 204, a bearing 218 to constrain the rotational motion of the prism, a prism mount 220 to facilitate securing the prism to bearing 218, a prism rotation gear 222 to transfer motive force from a drive motor 224, and a position sensor 226 to provide feedback. Mounting bracket 214 is situated at the exit of input optics 206. Mounting bracket 214 may include any suitable structure configured to provide a structural support and mounting surface for components of imaging system 200, and may further interface or align with input optics 206 to maintain relative positions of supported components. Mounting bracket 214 may include a central mount 228, in which bearing 218 is installed (e.g., press-fit), an upper camera mount 230 for attachment of first sensor assembly 210, and a lower camera mount 232 for attachment of second sensor assembly 212.

As best shown in FIGS. 9 and 10, prism 204 is a multi-faceted prism having an incident face 234, an angled reflective face 236, and an extension portion 238. Prism 204 is mounted with incident face 234 toward input optics 206. Accordingly, incident radiation passes along axis 216 and into prism 204 through incident face 234. The radiation then encounters angled reflective face 236, and is reflected approximately ninety degrees, toward extension portion 238. Extension portion 238 may be configured to extend the path radiation must take through the higher-index prism before exiting at exit face 240. Exit face 240 will be adjacent sensor assembly 210 or 212, depending on the orientation of the prism. Prism 204 may be positioned, configured, and/or shaped such that the focal plane of input optics 206 is caused to coincide with the adjacent sensor.

Bearing 218 and prism mount 220 may include any suitable structures configured to facilitate secure attachment of prism 204 to a rotatable structure. In the example shown in FIGS. 4-8, bearing 218 is a mechanical ring bearing configured to constrain motion to axial rotation and to reduce friction between the components. Prism mount 220 is press fit, unitary with, or attached to bearing 218, and provides a conforming surface for attaching prism 204 while ensuring incident face 234 is exposed to the input optics. In some examples, prism 204 is attached to prism mount 220 by optical cement.

Prism rotation gear 222 is a fine-toothed gear plate that is attached to the prism mount/bearing assembly. For example, gear 222 may be coaxially attached to a face of prism mount 220 by one or more fasteners (e.g., screws or bolts). Prism rotation gear 222 may include a cutout or gap in the gear plate, such that the gear plate fits around the prism. Gear 222 does not need to have a complete circumference, as the gear is not rotated a full 360 degrees.

Gear 222 may be referred to as a follower gear. A drive gear 242 is rotated by motor 224, and is engaged or meshed with prism rotation gear 222 to produce rotational motion. Position sensor 226 may include a feedback gear 244, engaged with and driven by prism rotation gear 222. Position sensor 226 (or an associated controller) may determine prism orientation based on rotational positioning information received from the prism rotation gear. For example, feedback gear 244 may rotate by an amount proportional to the rotation of the follower gear, and may further be operatively connected to a device such as a potentiometer. The potentiometer, in turn, may be configured to adjust an electrical signal and thereby convey information corresponding to the original rotation. Positional feedback may be provided to a controller (not shown), which may also control speed and direction of motor 224.

As best seen in FIGS. 6-8, prism rotation gear 222 may include one or more protrusions, such as pins 246 and 248. Pins 246 and 248 are configured and positioned to interface with corresponding mechanical stops 250 and 252 on mounting bracket 214. As shown in FIGS. 6 and 7, the pins and mechanical stops are positioned such that prism 204 is mechanically prevented from rotating beyond the expected 180 degrees in either direction. This mechanical stop arrangement may function as a back-up system, as motor 224 will typically be controlled to precisely orient the prism. During normal operation, motor 224 may hold each pin against its respective stop, rather than be prevented from rotation by hitting the stop. Mechanical stops 250 and/or 252 may be adjustable.

FIG. 6 shows imaging system 200 with prism 204 "pointing up." In other words, prism 204 is oriented such that radiation collected by the objective is redirected toward first sensor assembly 210, through extension portion 238. Pin 246 is adjacent to mechanical stop 250. As indicated by arrow 254, counterclockwise rotation of prism drive system 208 results in the prism orientation shown in FIG. 7. As seen in FIG. 7, prism 204 is "pointing down," after rotating 180 degrees, and directing radiation toward second sensor assembly 212. Pin 248 is adjacent to mechanical stop 252.

IX. Method

Figure 11:
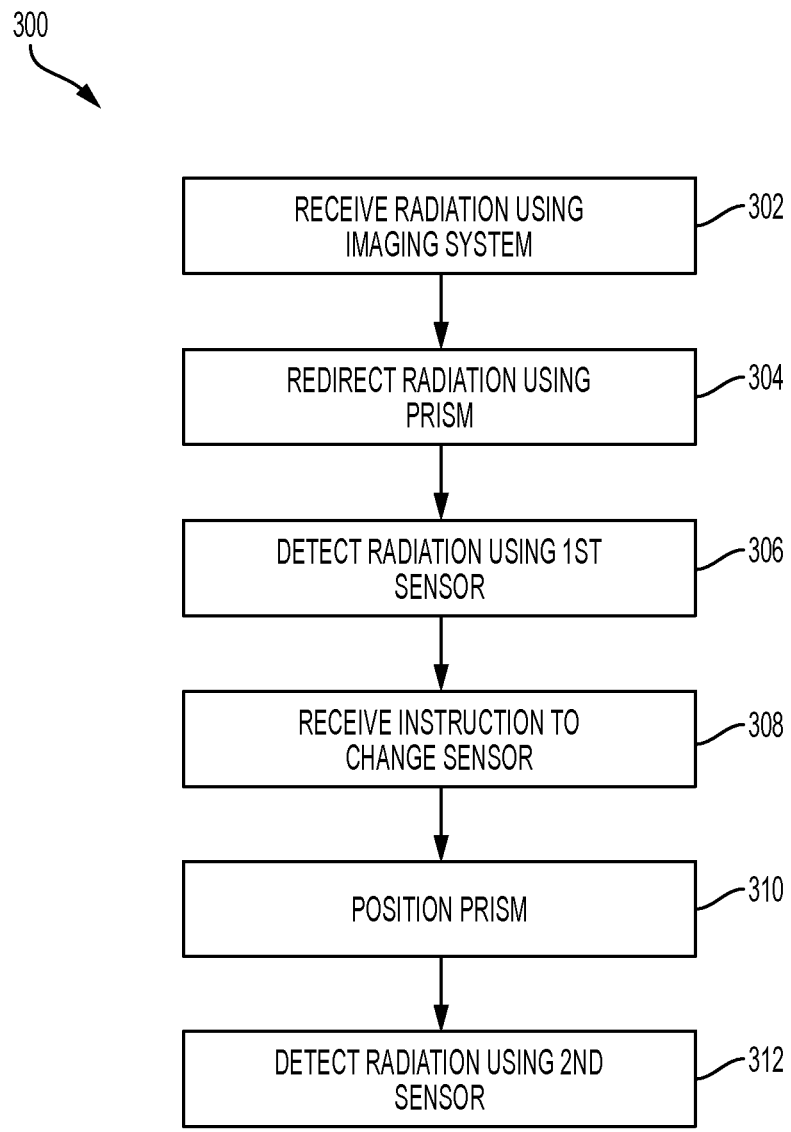
FIG. 11 is a flowchart showing steps of an illustrative method for utilizing an imaging system equipped with a positionable prism.

This section describes a method for imaging using a single objective and multiple sensors; see FIG. 11. Aspects of imaging systems described above may be utilized in the method steps described below. Where appropriate, reference may be made to previously described components and systems that may be used in carrying out each step. These references are for illustration, and are not intended to limit the possible ways of carrying out any particular step of the method.

FIG. 11 is a flowchart illustrating operations performed in an illustrative method, and may not recite the complete process or all steps of the process. FIG. 11 depicts multiple steps of a method, generally indicated at 300, which may be performed in conjunction with imaging systems having positionable reflectors, according to aspects of the present disclosure. Although various steps of method 300 are described below and depicted in FIG. 11, the steps need not necessarily all be performed, and in some cases may be performed in a different order than the order shown.

At step 302 of method 300, incident radiation may be received by input optics of an imaging system having a positionable reflector (e.g., a mirror or prism). The reflector may be configured to redirect the incident radiation. The imaging system may form a part of or be incorporated into a host apparatus. In some examples, the imaging system may comprise a portion of a gimbal system, a pan-tilt system, a handheld imaging system, and/or a static imaging system.

At step 304 of method 300, incident radiation may be redirected from an input optical axis to a secondary axis different from the input optical axis, using the positionable reflector (e.g., mirror or prism).

At step 306 of method 300, the redirected incident radiation may be detected by a first sensor. The first sensor and associated processor may process the sensed information to produce a first digital image.

At step 308 of method 300, a request or instruction may be received, requesting to utilize a second sensor to process the incident radiation from the input optics. This request or instruction may be input (e.g., by a user), or may be generated (e.g., by a processor or controller, such as of the host system).

At step 310 of method 300, in response to the request, the reflector (e.g., the prism) may be positioned such that the incident radiation is directed to the second sensor. This step may include rotating the reflector, translating the reflector, or any combination of such movements. In some embodiments, moving the reflector may cause the incident radiation to be redirected to a second secondary axis different from the input optical axis and the first secondary axis. For example, a prism may be rotated a predetermined amount, such as 180 degrees, about the optical input axis or any other suitable axis. In some embodiments, moving the reflector may cause the incident radiation to no longer be redirected, such that the incident radiation continues or is caused to proceed along the input optical axis. This may be the case, for example, when moving the reflector includes moving the reflector entirely out of the path of the incident radiation.

At step 312 of method 300, the incident radiation may be detected by a second sensor different from the first sensor. The second sensor and associated electronics may process the sensed information to produce a second digital image.

In some examples, one or more of the sensors may be fixed relative to the payload. In some examples, more than two sensors may be utilized. For example, three sensors may be spaced around the reflector, and the reflector may be selectively movable to direct incident radiation to any one of the three sensors. Any other suitable number of sensors and positions may be utilized. As described above, one or more mechanical stops may be present. As described above, one or more positional feedback mechanisms may be included. As described above, a drive system may be used to move the prism.

X. Selected Embodiments

This section describes additional aspects and features of imaging systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An imaging system, comprising:
input optics configured to receive incident radiation along an input optical axis;
a first optical sensor and a second optical sensor, each configured to detect the incident radiation; and
a reflector selectively positionable to a first orientation, in which the reflector directs the incident radiation along a first secondary axis to the first optical sensor, and to a second orientation, in which the reflector directs the incident radiation along a second secondary axis toward the second optical sensor.

A1. The imaging system of paragraph A0, wherein the reflector comprises a prism.

A2. The imaging system of paragraph A0, wherein the prism includes an extension portion protruding along the first secondary axis when the prism is positioned to the first orientation.

A3. The system of paragraph A0, further including a drive system operatively connected to the reflector, the drive system configured to selectively position the reflector.

A4. The system of paragraph A3, wherein the drive system is configured to rotate the reflector.

A5. The system of paragraph A4, wherein the reflector is rotatable about the optical input axis.

A6. The system of paragraph A0, wherein the first secondary axis is transverse to the optical input axis.

A7. The system of paragraph A6, wherein the first secondary axis is approximately orthogonal to the optical input axis.

A8. The system of paragraph A0, further including a controller configured to control positioning of the reflector.

A9. The system of paragraph A8, further including a motor operatively connected to the reflector for positioning the reflector, the motor being controlled by the controller.

A10. The system of paragraph A8, further including a feedback mechanism configured to sense an orientation of the reflector and provide corresponding information to the controller.

A11. The system of paragraph A0, wherein the first sensor is configured to process near infrared radiation.

A12. The system of paragraph A0, wherein the first sensor is configured to process visible light and produce a color image.

B0. A gimbal system, comprising:
a support portion;
a gimbal assembly pivotably connected to and supported by the support portion; and
a payload pivotably orientable with respect to the support portion by the gimbal assembly, to provide pan and tilt movement of the payload;
wherein the payload includes an imaging system having a single objective, a plurality of sensors associated with the single objective, and a selectively positionable reflector configured to direct incident radiation from the single objective to any one of the plurality of sensors.

B1. The gimbal system of paragraph B0, wherein the reflector comprises a rotatable prism.

B2. The gimbal system of paragraph B0, further including a drive system operatively connected to the reflector, the drive system configured to selectively position the reflector.

B3. The gimbal system of paragraph B2, wherein the drive system is configured to rotate the reflector.

B4. The gimbal system of paragraph B3, wherein the reflector is rotatable about an optical input axis of the single objective.

B5. The gimbal system of paragraph B0, wherein the reflector is configured to redirect the incident radiation by one of a plurality of selected angles, each selected angle corresponding to one of the sensors.

B6. The gimbal system of paragraph B0, further including a controller configured to control positioning of the reflector.

B7. The gimbal system of paragraph B6, further including a motor operatively connected to the reflector, the motor being controlled by the controller.

B8. The gimbal system of paragraph B6, further including a feedback mechanism configured to sense a position of the reflector and to provide corresponding information to the controller.

B9. The gimbal system of paragraph B0, wherein the plurality of sensors includes a sensor capable of processing near infrared.

B10. The gimbal system of paragraph B0, wherein the plurality of sensors includes a sensor capable of processing visible light and producing a color image.

C0. A method of using an imaging system, the method comprising:
receiving incident radiation using an imaging system, the imaging system having input optics and a positionable reflector configured to redirect incident radiation received by the input optics;
redirecting the incident radiation from an input optical axis to a first secondary axis different from the input optical axis using the positionable reflector;
detecting the redirected incident radiation using a first sensor;
receiving a request to utilize a second sensor to process the incident radiation received by the input optics;
responding to the request by positioning the reflector such that the incident radiation is directed along a second secondary axis; and
detecting the incident radiation using a second sensor different from the first sensor.

C1. The method of paragraph C0, wherein the positionable reflector comprises a prism.

C2. The method of paragraph C0, further including using the first sensor to convert the incident radiation into sensed electronic information, and to process the sensed electronic information to produce a first image.

C3. The method of paragraph C2, further including using the second sensor to convert the incident radiation into sensed electronic information, and to process the sensed electronic information to produce a second image.

C4. The method of paragraph C0, wherein receiving the request includes receiving an input from a user.

C5. The method of paragraph C0, wherein receiving the request includes receiving an input generated by a processor of a host system.

C6. The method of paragraph C0, wherein positioning the reflector includes rotating the reflector.

C7. The method of paragraph C0, wherein positioning the reflector includes translating the reflector.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An imaging system, comprising:
    input optics configured to receive incident radiation along an input optical axis;
    a first optical sensor and a second optical sensor, each configured to detect the incident radiation;
    a rotating member positioned between the first and second optical sensors and configured to rotate about the input optical axis; and
    a reflector coupled to the rotating member configured to be selectively positionable by the rotating member to a first orientation, in which the reflector directs the incident radiation along a first secondary axis to the first optical sensor, and to a second orientation, in which the reflector directs the incident radiation along a second secondary axis toward the second optical sensor.

2. The imaging system of claim 1, wherein the reflector comprises a prism comprising an incident face, an angled reflective face, and an extension portion, wherein the prism is configured to receive the incident radiation at the incident face and pass the incident radiation to the angled reflective face, wherein the angled reflective face is configured to redirect the incident radiation through the extension portion along the first and/or second secondary axis and toward the first and/or second optical sensor.

3. The imaging system of claim 2, wherein the extension portion protrudes along the first secondary axis when the prism is positioned to the first orientation, and wherein the extension portion protrudes along the second secondary axis when the prism is positioned to the second orientation.

4. The system of claim 1, wherein the rotating member is rotatable about an axis parallel to the optical input axis, the system further comprising:
    a motor comprising a drive gear coupled to the rotating member configured to rotate the rotating member;
    a controller electrically coupled to the motor configured to provide an electrical signal to control the motor; and
    a feedback mechanism comprising a feedback gear coupled to the rotating member configured to rotate proportional to the rotating member.

5. The system of claim 4, wherein the motor is further configured to rotate the rotating member to selectively position the reflector toward the first and/or second optical sensor.

6. The system of claim 4, wherein the feedback mechanism further comprises a position sensor coupled to the feedback gear configured to sense a position and an orientation of the rotating member and provide associated position and orientation information to the controller, wherein the position sensor comprises a potentiometer, a counter, and/or a switch.

7. The system of claim 1, wherein the first secondary axis is substantially orthogonal to the optical input axis.

8. The system of claim 7, wherein the second secondary axis is substantially orthogonal to the optical input axis and parallel to the first secondary axis.

9. The system of claim 1, further including a gimbal assembly pivotably coupled to the imaging system, wherein the imaging system is pivotably orientable by the gimbal assembly to provide a pan and tilt movement of the imaging system.

10. A gimbal system, comprising:
    a support portion;
    a gimbal assembly pivotably connected to and supported by the support portion; and
    a payload pivotably orientable with respect to the support portion by the gimbal assembly, to provide pan and tilt movement of the payload;
    wherein the payload includes an imaging system having a single objective, a plurality of sensors associated with the single objective, and a selectively positionable reflector configured to direct incident radiation from the single objective to any one of the plurality of sensors.

11. The gimbal system of claim 10, wherein the positionable reflector comprises a rotatable prism.

12. The gimbal system of claim 10, further including a drive system operatively connected to the positionable reflector, the drive system configured to selectively position the reflector by rotating the reflector about an input optical axis.

13. The gimbal system of claim 10, wherein the positionable reflector is configured to redirect the incident radiation by one of a plurality of selected angles, each selected angle corresponding to one of the sensors.

14. The gimbal system of claim 10, further comprising:
    a rotating member coupled to the reflector;
    a motor comprising a drive gear coupled to the rotating member configured to rotate the rotating member;
    a controller electrically coupled to the motor configured to provide an electrical signal to control the motor; and
    a feedback mechanism comprising a feedback gear coupled to the rotating member configured to rotate proportional to the rotating member, wherein the feedback mechanism further comprises a position sensor coupled to the feedback gear configured to sense a position and an orientation of the rotating member and provide position and orientation information to the controller.

15. A method of using the gimbal system of claim 10, the method comprising:
    receiving incident radiation using the single objective of the imaging system, wherein the single objective directs the incident radiation along a path corresponding to an input optical axis;
    redirecting the incident radiation from the input optical axis to a first secondary axis different from the input optical axis using the selectively positionable reflector;

detecting the redirected incident radiation using a first sensor of the plurality of sensors;

receiving a request to utilize a second sensor of the plurality of sensors to process the incident radiation received by the input optics;

responding to the request by positioning the selectively positionable reflector such that the incident radiation is directed along a second secondary axis; and detecting the incident radiation using the second sensor different from the first sensor.

16. The method of claim 15, wherein the positionable reflector comprises a prism comprising an incident face, an angled reflective face, and an extension portion, wherein the prism is configured to receive the incident radiation at the incident face and pass the incident radiation to the angled reflective face, wherein the angled reflective face is configured to redirect the incident radiation through the extension portion along the first and/or second secondary axis and toward the first and/or second optical sensor.

17. The method of claim 15, further including using the first sensor to convert the incident radiation into sensed electronic information, and to process the sensed electronic information to produce a first image.

18. The method of claim 17, further including using the second sensor to convert the incident radiation into sensed electronic information, and to process the sensed electronic information to produce a second image.

19. The method of claim 15, wherein receiving the request includes receiving an input generated by a processor of a host system.

20. The method of claim 15, further comprising a rotating member coupled to the reflector, wherein positioning the reflector includes rotating the reflector using the rotating member.

* * * * *

UNITED STATES PATENT AND TRADEMARK OFFICE
CERTIFICATE OF CORRECTION

| | |
|---|---|
| PATENT NO. | : 10,057,509 B2 |
| APPLICATION NO. | : 14/727790 |
| DATED | : August 21, 2018 |
| INVENTOR(S) | : Adam C. Espersen, Stephen V. McKaughan and Nicholas J. Lagadinos |

It is certified that error appears in the above-identified patent and that said Letters Patent is hereby corrected as shown below:

In the Detailed Description:

In Column 9, Line 11, change "(CODs)" to --(CCDs)--.

Signed and Sealed this
Sixteenth Day of October, 2018

Andrei Iancu
*Director of the United States Patent and Trademark Office*